United States Patent [19]
Glynn et al.

[11] Patent Number: 5,078,305
[45] Date of Patent: Jan. 7, 1992

[54] SIMULTANEOUS FILL-DISPENSE INVERT DISPENSER CONTAINER

[75] Inventors: Kenneth P. Glynn, Raritan Township, Hunterdon County, N.J.; Charles Goldstein, Ramapo Township, Rockland County, N.Y.

[73] Assignee: Delta Dispensing, Inc., Flemington, N.J.

[21] Appl. No.: 580,187

[22] Filed: Sep. 10, 1990

Related U.S. Application Data

[63] Continuation-in-part of Ser. No. 440,641, Nov. 24, 1989.

[51] Int. Cl.⁵ .............................................. G01F 11/28
[52] U.S. Cl. ..................................... 222/442; 222/446; 222/448; 222/449; 222/456
[58] Field of Search ............... 222/182, 442, 445, 446, 222/448-450, 454-457

[56] References Cited

U.S. PATENT DOCUMENTS

| | | | |
|---|---|---|---|
| 1,283,050 | 10/1918 | Berg | 222/446 |
| 2,038,418 | 4/1936 | Conner | 222/446 |
| 2,133,679 | 10/1938 | Woeltjen | 222/442 |
| 2,331,659 | 10/1943 | Cutone | 222/445 |
| 2,343,024 | 2/1944 | Pearl | 222/455 X |
| 2,446,085 | 7/1948 | Gronemeyer et al. | |
| 2,632,787 | 12/1950 | Romyns | 222/442 |
| 2,760,692 | 8/1956 | Buehlig | 222/455 X |
| 2,859,900 | 11/1958 | Kiyuna | 222/449 X |
| 2,889,966 | 6/1959 | Burt | 222/445 |
| 3,237,816 | 3/1966 | Anderson | 222/450 |
| 3,402,860 | 9/1968 | Torongo, Jr. | |
| 3,429,485 | 2/1969 | Harkay | 222/449 X |
| 4,170,318 | 10/1979 | Saeki et al. | 222/455 |
| 4,298,038 | 11/1981 | Jennings | 222/454 X |
| 4,376,495 | 3/1983 | Spatz | 222/309 X |
| 4,778,087 | 10/1988 | Desai | 222/449 |
| 4,830,226 | 5/1989 | Kong | 222/437 X |
| 4,886,193 | 12/1989 | Wassilieff | 222/454 X |
| 4,951,839 | 8/1990 | Kong | 222/454 X |

Primary Examiner—Kevin P. Shaver
Attorney, Agent, or Firm—Kenneth P. Glynn

[57] ABSTRACT

The present invention involves a container having a metered dispensing unit at its outlet, which can simply be opened and poured with assured metered dispensing. The container dispensing unit has a loading chamber, a loading chamber fill port, a dispensing chamber, a dispensing chamber outlet port and a connecting orifice. The loading chamber is located at least partly adjacent to the dispensing chamber. The loading chamber fill port is located at an upper portion of the loading chamber such that when the loading chamber is tipped for pouring, liquid in the container may fill the loading chamber. The connecting orifice connects a lower portion of the loading chamber with a lower portion of the dispensing chamber. The dispensing chamber is connected to the container main body for liquid flow thereto from the container only via the loading chamber. The dispensing chamber outlet port is located at the top of both the dispensing chamber and the dispensing unit. The dispensing unit also includes a closable valve located in the connecting orifice of the inner rim, a biasing device maintaining the valve in a closed position while being capable of moving the valve to an open position by downward force. The dispensing unit further includes a cap located at the top of the container and a mechanism connectively related to the cap so as to apply downward force on the valve and biasing device when the cap is closed, so as to open the valve when the cap is closed, and so as to remove the downward force on the valve when the cap is open.

17 Claims, 5 Drawing Sheets

SIMULTANEOUS FILL-DISPENSE INVERT DISPENSER CONTAINER

REFERENCE TO RELATED CASE

This application is a continuation-in-part of copending U.S. patent application Ser. No. 07/440,641, filed on Nov. 24, 1989 by Kenneth P. Glynn, inventor, entitled "Metered Invert Dispenser".

BACKGROUND OF THE INVENTION

1. Field of the Invention

The present invention is directed to metered dispensing and, more particularly, to containers with metered dispensing units which are either unistructurally formed as integral thereto or as separate, add on units. The container is inverted by the user to simultaneously allow liquid to pour out of a dispensing chamber and fresh liquid to pour into a loading chamber of the metered dispensing unit. When it is uprighted, excessive liquid returns to the main compartment of the container so as to leave a predetermined metered volume of liquid in the loading chamber. When the cap is put back on, a connecting orifice valve is opened to allow liquid to flow from the loading chamber to the dispensing chamber. When the cap is removed, the connecting orifice valve is closed and this permits pouring of the metered amount of liquid, with the loading chamber again simultaneously refilling.

2. Prior Art Statement

Metered dispensing is an art that has been developed over many decades. For example, U.S. Pat. No. 2,038,418 issued in 1936 to B. F. Connor shows a measuring cup located within the neck of a bottle for metered dispensing. The cup includes two openings, one at the upper side and the other at the bottom, with a valve and stem floating in the bottom opening. The bottle of Connor is inverted for filling of the cup. To be used, the bottle must be inverted vertically after the cap is removed to simultaneously pour the liquid in the cup and shut off the main compartment of the bottle. The Connor device has some limitations that may cause failure. For example, the bottle would not necessarily shut off the main compartment if tilted at a slant (which is normal for pouring) instead of vertically. Also, the upper side opening does not close off during pouring and may permit additional liquid flow which would vary depending on how long the bottle is held upside down, thereby causing improper dispensing.

U.S. Pat. No. 2,466,085 issued in 1948 to Gronemeyer, et al shows variations in metered dispensing. For example, a small tube has a flap which is opened by a closed cap; the bottle is inverted for filling the tube; while kept upside down, the bottle cap is partially opened to close off the flap; subsequent removal of the cap permits metered pouring. However, if the cap is not twisted enough, or too much, either the flap might not close all the way, or the liquid will pour out prematurely. In one embodiment, FIGS. 5-7, Gronemeyer uses a pliable plastic sac with a predetermined level side slit. The slit is spread open by a closed cap; the bottle is inverted for filling and uprighted for overflow. The cap is removed and the slit in the sac closes for metered dispensing. However, strong sacs may be difficult to open adequately, especially by arthritics taking medicine. Weaker sacs may wear, rip or break and not close completely. Further, the closed slit is not sealed by a valve and leakage may occur.

U.S. Pat. No. 1,283,050 issued in 1918 to Berg shows a squeeze bottle with a ball valve in the bottle neck below a fixed volume compartment. A cap extension opens the valve while the cap is closed.

However, if a user squeezes the bottle to fill the compartment, the cap must be removed immediately, or the bottle kept inverted, to avoid having the compartment liquid return to the main part of the bottle.

U.S. Pat. No. 3,402,860 to Torongo describes a squeeze bottle with a chamber which has an elongated bore or inner wall that acts to set volume in the chamber and to limit air or liquid backflow. Unless a viscous liquid is used and care is taken not to squeeze the bottle during dispensing, surplus dispensing may occur.

U.S. Pat. No. 4,376,495, issued in 1983 to W. B. Spatz, describes a complex adjustable dosage metered dispensing system. An adjustable piston is utilized with a squeeze system whereby the cap has a protrusion which both caps off the tube opening and sets the piston.

U.S. Pat. No. 4,830,226 to Kong describes a liquid dispensing apparatus for dispensing a measured amount of liquid from a container which is adjustable for allowing different measured amounts of liquid to be dispensed from the same container. The apparatus is adaptable for use in the context of two-compartment, squeeze type containers and two-compartment, inversion-type containers and relies upon dual valves with complex internal mechanisms.

Notwithstanding the prior art discussed above, there has been no teaching of an easily cast, effective, metered dispensing system which operates simply and reliably as does the device of the present invention.

SUMMARY OF THE INVENTION

The present invention involves a container having a metered dispensing unit at its outlet, which can simply be opened and poured with assured metered dispensing. The container dispensing unit has a loading chamber, a loading chamber fill port, a dispensing chamber, a dispensing chamber outlet port and a connecting orifice. The loading chamber is located at least partly adjacent to the dispensing chamber. The loading chamber fill port is located at an upper portion of the loading chamber such that when the loading chamber is tipped for pouring, liquid in the container may fill the loading chamber. The connecting orifice connects a lower portion of the loading chamber with a lower portion of the dispensing chamber. The dispensing chamber is connected to the container main body for liquid flow thereto from the container only via the loading chamber. The dispensing chamber outlet port is located at the top of both the dispensing chamber and the dispensing unit. The dispensing unit also includes a closable valve located in the connecting orifice, with biasing means maintaining the valve in a closed position while being capable of moving the valve to an open position by downward force. The dispensing unit further includes a cap located at the top of the container and means connectively related to the cap so as to apply downward force on the valve and biasing means when the cap is closed, so as to open the valve when the cap is closed, and so as to remove the downward force on the valve when the cap is open.

BRIEF DESCRIPTION OF THE DRAWINGS

The present invention is more fully appreciated when the specification herein is taken in conjunction with the appended drawings wherein.

DETAILED DESCRIPTION OF THE INVENTION

As mentioned above, the present invention involves a container for simultaneous dispensing of a metered amount of liquid and refilling of the dispensing unit for subsequent metered pouring. The present invention container may be made of plastic, glass or other material and the exact physical structure or dimensions are within the purview of the artisan. Basically, the present invention container may be prefilled in such a way that a metered amount is obtained on the first pour, or a first, capped tipping of the container may be required to beginning the sequence of simultaneous filling and pouring. This will be left to the particular design of the container and instructions on the container will be appropriate for the use and user. The present invention container is described with respect to various embodiments in conjuction with the drawings, but the exact mechanisms of valving and closure may encompass any which are known or available in the art.

Figure 1:
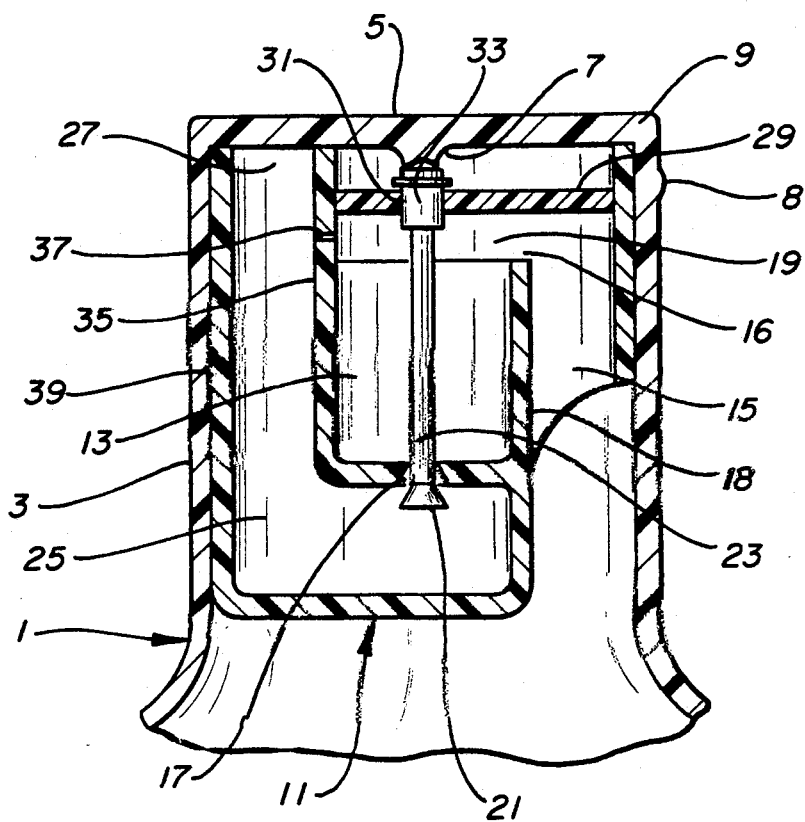
FIG. 1 shows a partial side cut view of a present invention container in its capped position.

Referring now to FIG. 1, there is shown a container 1 which includes a neck 3 and a flip cap 5, as well as a liquid metered dispensing unit shown generally as 11. Flip cap 5 has a male portion of a push-pull attachment 7 which is partially inserted in a removable fashion into stem head 33 in FIG. 1.

Figure 5:
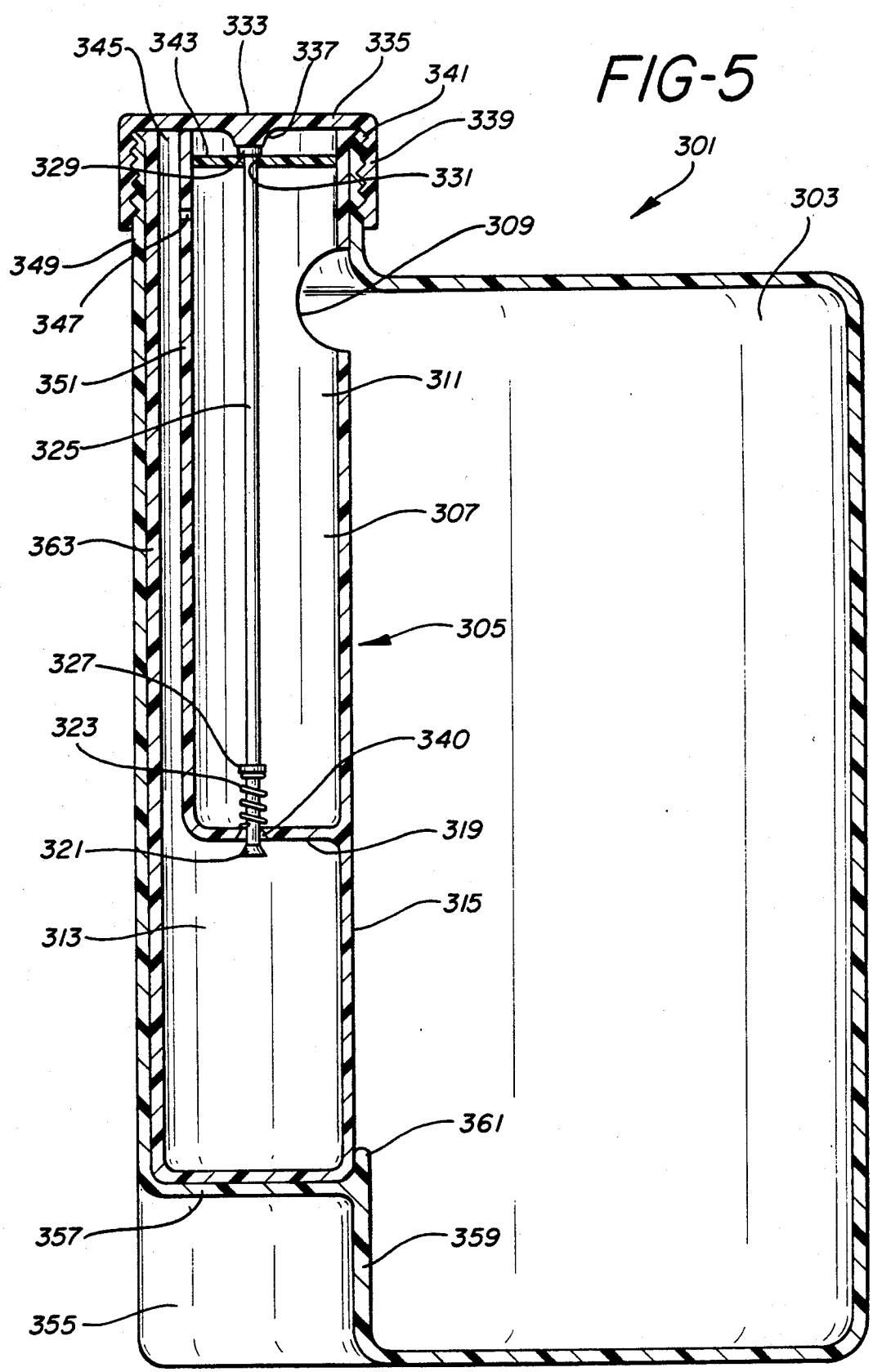
FIG. 5 shows another side cut view of a different alternative present invention container; and, FIG. 6 illustrates a full, side view of the present invention container shown in FIG. 5.

Liquid metered dispensing unit 11 includes loading chamber 13 as well as loading chamber fill port 15 as can be seen, the fill port 15 is located in upper portion 19 of loading chamber 13. In this particular embodiment, fill port 15 is tubular in nature and, coupled with the opening 16, forms a fill port. However, as shown in FIG. 5 described below the fill port may actually be a port rather than a tube. The critical aspect of the fill port in general is that it allows for liquid to enter the loading chamber such as loading chamber 13 while liquid is simultaneously being dispensed from a dispensing chamber such as dispensing chamber 25.

There is a connecting orifice 17 which connects loading chamber 13 to dispensing chamber 25. Valve 21 is located in the area of connecting orifice 17 so that the valve may open and close orifice 17 as more fully described below. Valve 21 is attached to valve stem 23, having head 33 which contains the female portion (not shown) of the push-pull attachment. Common wall 35 divides loading chamber 13 from dispensing chamber 25 and vent port 37 is contained in the common wall 35.

Wall 39 of dispensing chamber 25 terminates at dispensing chamber outlet port 27 as shown. Top wall 29 of liquid metered dispensing unit 11 contains a top wall orifice 31 with which stem head 33 tightly moves upwardly and downwardly.

When flip cap 7 having flip cap top 9 and living hinge 8 is closed as shown, stem head 33, stem 23 and valve 21 are pushed downwardly and connecting port 17 is in the open position. It can be seen that, when container 1 is upright and fill cap 5 is closed as shown in FIG. 1, any liquid contained in loading chamber 13 will, by gravity, pass through connecting orifice 17 and fill dispensing chamber 25 until a common liquid level is obtained and a metered amount of liquid is filled in dispensing chamber 25. For example, in the case where container 1 has liquid in it and has been inverted, upon being uprighted, liquid will substantially fill loading chamber 13 and will fill dispensing chamber 25 to the extent that liquid has not risen to the common level therein. The process will repeatedly yield the same volume of liquid in dispensing chamber 25 due to the fixed amount of volume which will fill loading chamber 13 as defined by opening 16 and the height of wall 18 which contains the loading chamber fill port 15.

When fill cap 5 of FIG. 1 is opened, the push-pull attachment 7 lifts stem head 33, stem 23 and valve 21 upwardly such that valve 21 shuts of connecting orifice 17 so that no more liquid is capable of flowing from loading chamber 13 to dispensing chamber 25. After flip cap 5 is opened and connecting orifice 17 has simultaneously been closed, the container may be tilted or inverted for pouring.

Figure 2:
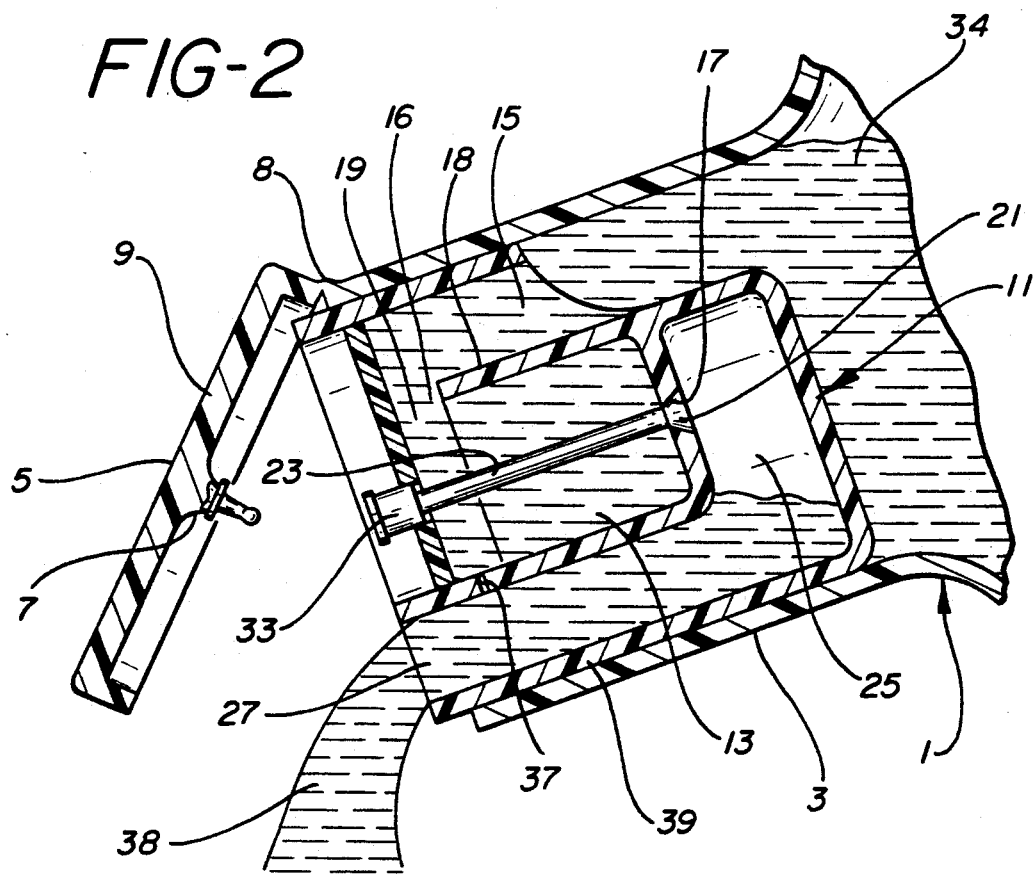
FIG. 2 is a partial side cut view of the FIG. 1 container in its uncapped, partially inverted, pouring position.

Referring now to FIG. 2, container 1 of FIG. 1 is again shown, but with liquid 34 contained therein. Since flip cap 5 has been opened and stem 23 and valve 21 had been moved to close connecting orifice 17, only the liquid already contained in dispensing chamber 25 pours out as liquid 38 in a predetermined metered amount. Simultaneously, liquid 34 floods loading chamber 13 and when the container 1 is uprighted, dispensing chamber 25 will have been emptied and loading chamber 13 will have been filled to its top level. As can be seen, and as discussed above in conjunction with FIG. 1, when flip cap 5 is closed, push-pull mechanism 7 pushes down stem 23 and valve 21 so as to open connecting orifice 17 and, by gravity, the liquid flows into dispensing chamber 25 to create a predetermined fill for the next metered dispensing.

Figure 3:
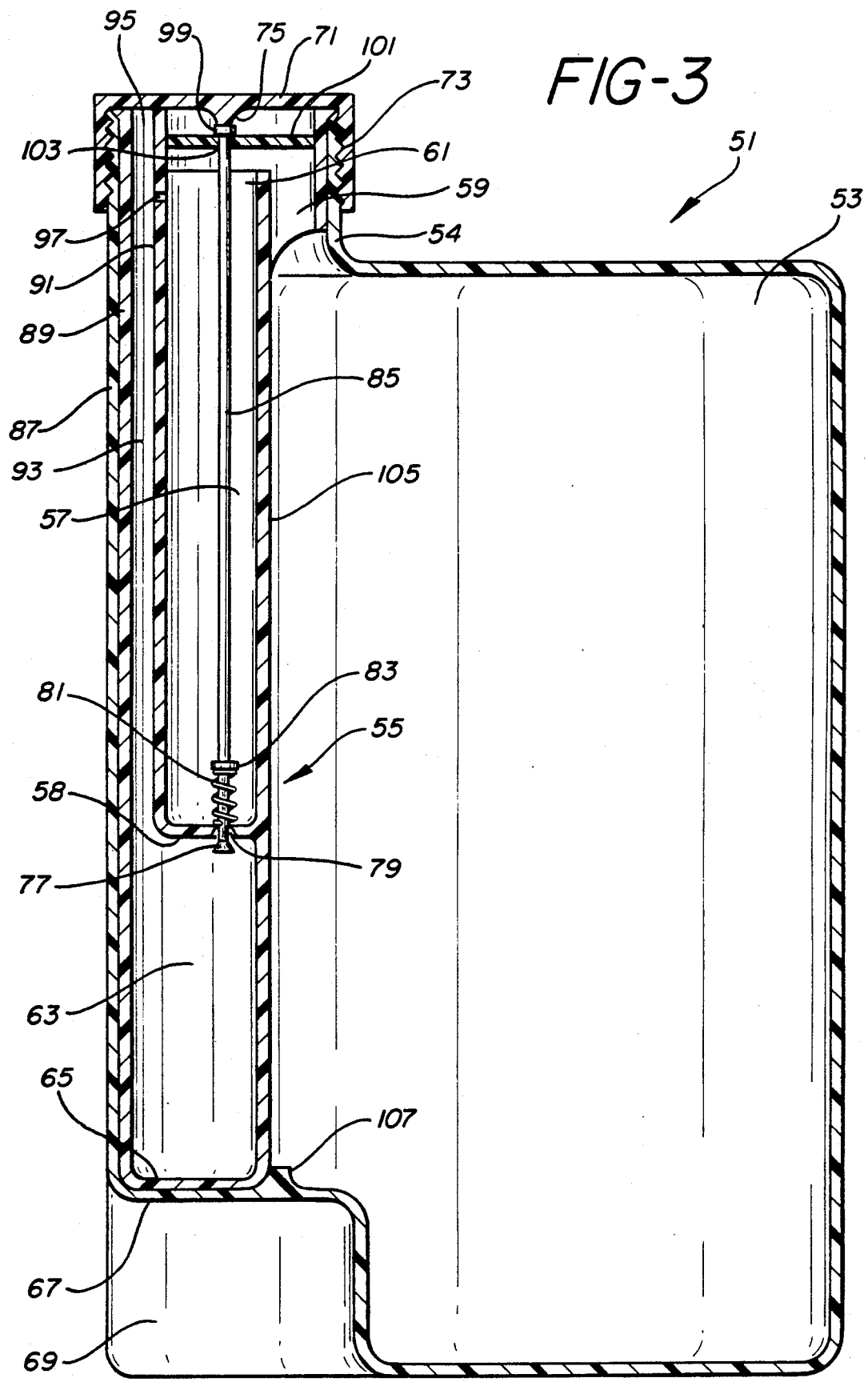
FIG. 3 illustrates a side cut view, another embodiment of the container of the present invention with the cap on and the connecting orifice valve open.

Referring now to FIG. 3, there is shown a side, cut view of an alternative present invention container 51 with its main container section 53 as shown. Contained in outlet neck 54 and extending downwardly to bottom 67 is liquid metered dispensing unit 55. This includes loading chamber 57 and dispensing chamber 63. Loading chamber outlet 59 is as shown, located near the upper portion 61 of loading chamber 57. Dispensing chamber 63 has a bottom 65 which rests on container 51 bottom 67 as shown and remains in place by stop 107. Cutout 69 is included in container 51 for snug stacking of a plurality of containers whereby the capped portion of a container would fit into the cutout 69.

Loading chamber 57 includes connecting orifice 79 and valve 77. Valve 77 is attached to stem 85 which includes spring stop 83 and spring 81. These are located in the bottom wall 58 of loading chamber 57. Stem 85 has a top flange 99 which has contact with extension 75 of screw cap 71, as shown. Screw cap 71 includes threads 73 for attachment to container 51 and liquid metered dispensing unit 55 includes a top section 101 which has an opening 103 for the stem 85. Dispensing chamber 63 includes a narrow opening 93 which extends to the top at dispensing unit outlet 95. Vent port 97 is also included in common wall 91. Outer wall 87 receives inner wall 89 and inner wall 89 becomes the surface upon which liquid will flow during pouring. When cap 71 is removed from container 51, its extended portion 75 lifts away from stem flange 99 and stem 85 moves upwardly by the force of spring 81 thereby moving valve 77 into connecting orifice 79 and closing connecting orifice 79.

When container 51 has cap 71 screwed tightly thereon as shown in FIG. 3, a first tipping will fill loading chamber 57 and this will drain into dispensing chamber 63. When cap 75 is removed and valve 77 closes connecting orifice 79, the container 51 is tipped for pouring and while liquid in dispensing chamber 63 exits at outlet 95, new liquid fills loading chamber 57. Because cap 71 is off and valve 77 is closed, the liquid entering loading chamber 57 does not enter into dispensing chamber 63. However, when the user is finished pouring the liquid from dispensing chamber 63 and the container is recapped, the valve 77 is opened by the force of cap 71 and liquid in loading chamber 57 fills dispensing chamber 63 for the next use.

Figure 4:
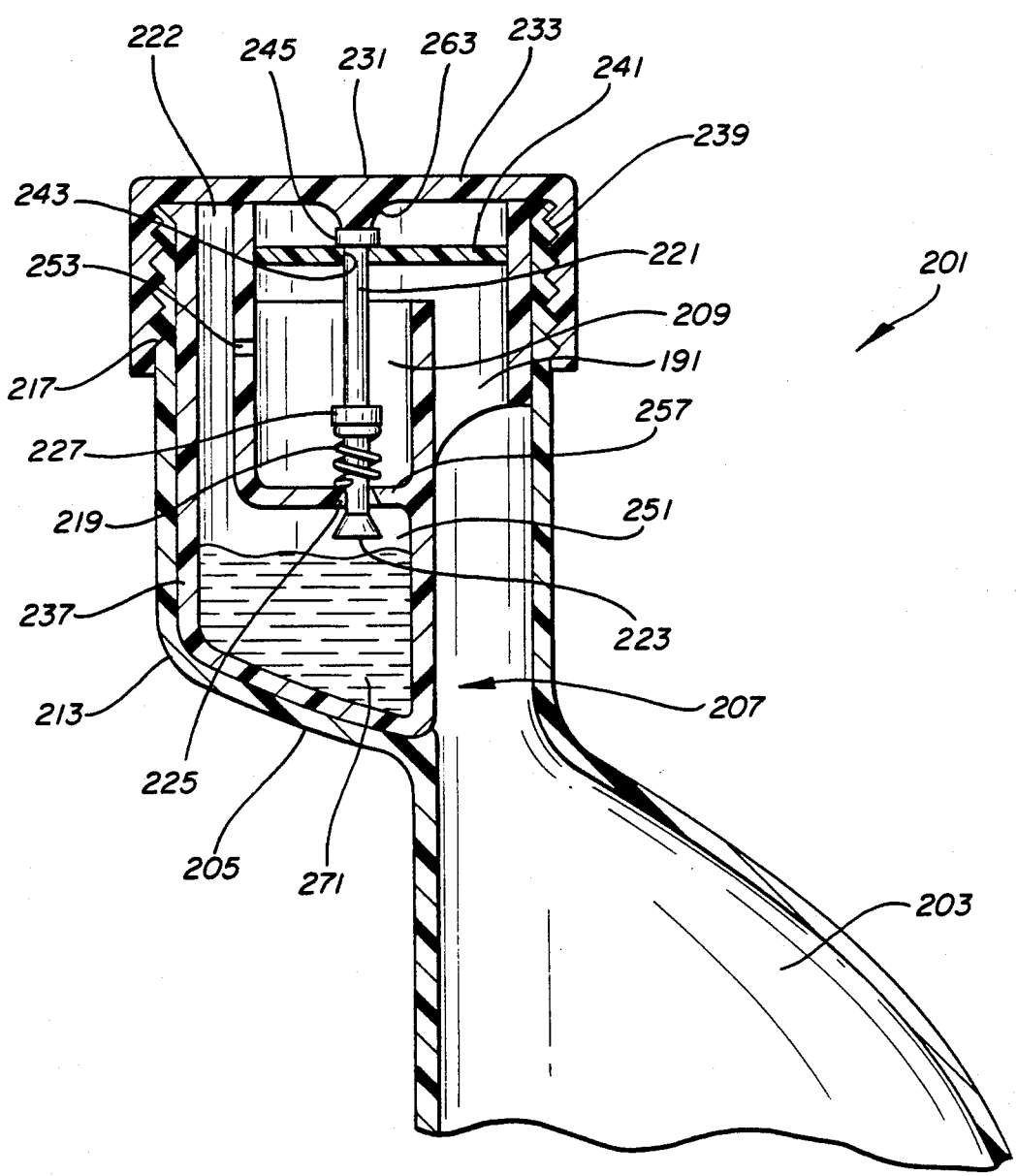
FIG. 4 shows a partial side cut view of an alternative present invention container with an offset outlet and dispensing unit.

FIG. 4 shows yet another embodiment of the present invention wherein container 201 has a main body section 203 and an offset barrel neck 205 with wall 213 extending to threading 217 and adapted to receive threads 239 of cap 231. Cap 231 has a top 233 with an extension 263 as shown. There is a stem 221 with a stop 227, a spring 219 and a valve 223, as shown. This is located in general in connecting orifice 225 which connects loading chamber 209 with dispensing chamber 251. As soon herein, dispensing chamber 251 has liquid 271 contained therein. Thus, it is in the fill mode and ready for pouring. Vent 253 is included and dispensing chamber 251 has a side wall 257 which culminates an outlet 222, as shown. When cap 213 is removed from container 201, the outlet 222 of liquid metered dispensing unit 207 is exposed for pouring of liquid 271 while, at the same time, spring 19 forces stem 221 upwardly and valve 223 closes off connecting orifice 225. As container 201 is tilted for pouring of liquid 271 from dispensing chamber 251, liquid passes up through loading chamber 209's inlet orifice 191. When container 201 is uprighted, loading chamber 209 is filled to a predetermined capacity. When cap 223 is subsequently tightened onto container 201, stem 221 and valve 223 are pushed downwardly and the liquid in loading chamber 209 flows into dispensing chamber 251 at a predetermined level and will then appear as shown in FIG. 4 for the next use to create simultaneous pouring and reloading.

Figure 6:
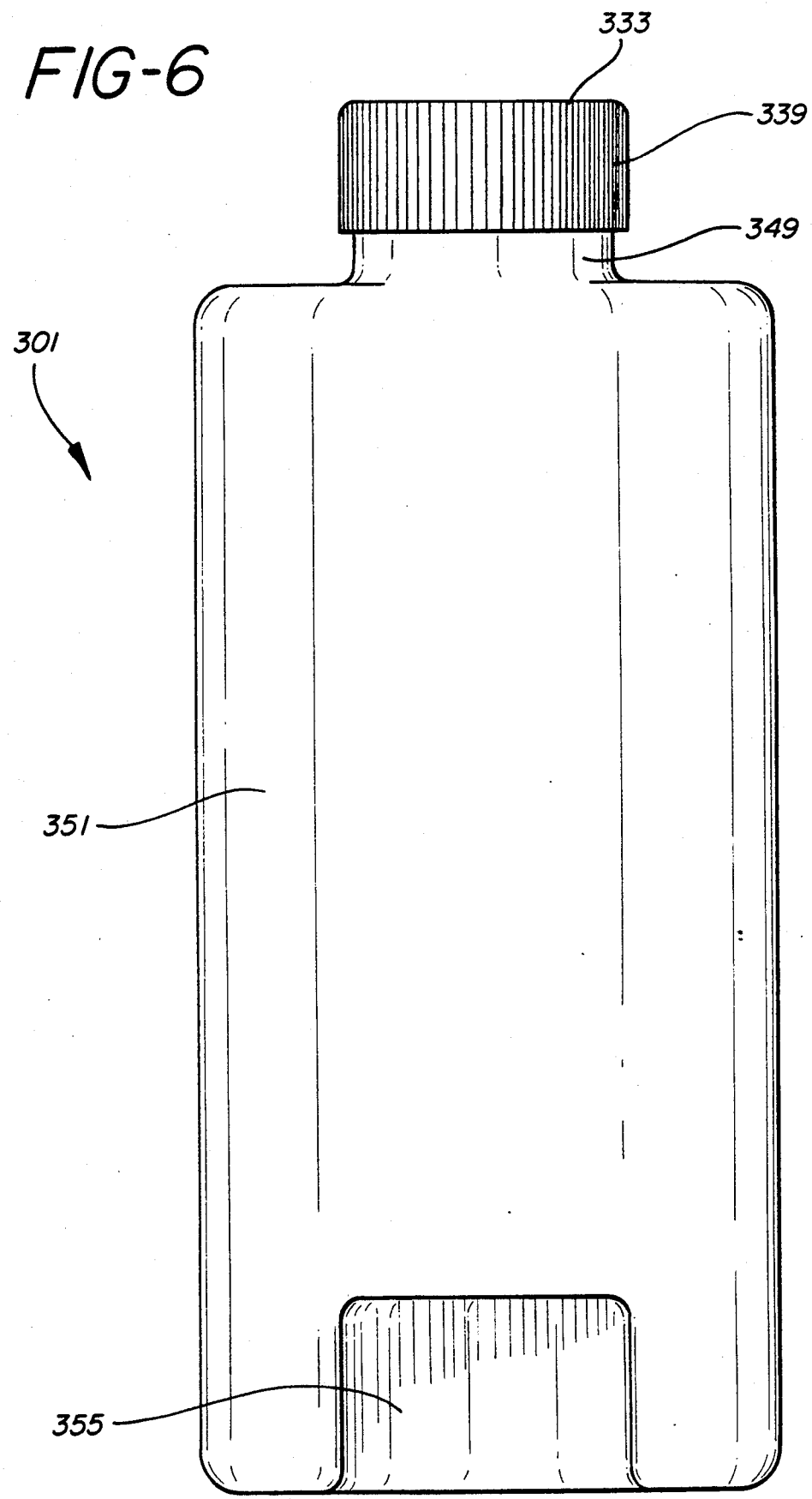

FIG. 5 shows a side cut view and FIG. 6 shows an end view of a container 301 of the present invention. Container 301 has a main body 303 and has a liquid metered dispensing unit 305 contained therein. Loading chamber 307 has an inlet orifice 309 which is located at upper portion 311 and has a bottom 319. Dispensing chamber 313 includes common wall 315 and common wall 351. Valve 321 is located on stem 325 and spring 323 is wrapped about stem 325 and held in place by stop 327. Stem 325 also has an expanded head or flange 329. Stem 325 passes through opening 331 in top wall 343, as shown. Wall 363 and wall 351 form an outlet tube from dispensing chamber 313, terminating in outlet 345.

Outer wall 349 includes threads 341 which receive cap 333 which has side wall 339 which is threaded. Cap 333 also has a top 335 with an extension 337 which contacts flange 329 on stem 325. When cap 333 is screwed on, as shown, extension 337 pushes on flange 329 and stem 325 and pushes valve 321 downwardly so as to open connecting orifice 340. When cap 333 is removed, spring 323 pushes stem 325 upwardly and valve 321 closes connecting orifice 340. The container 301 shown in FIGS. 5 and 6 function in a manner similar to that of FIG. 3, except that in this embodiment, the inlet port 309 for loading chamber 307 is a cutout in wall 315 rather than a tubular section. Vent 347 is provided and the device is utilized in a manner similar to that of FIG. 3 so that, during each dispersing, simultaneous pouring and recharging occurs. When cap 333 is then replaced, valve 321 opens and liquid flows from loading chamber 307 to dispensing chamber 313 for subsequent metered dispensing.

The present invention container and dispensing unit may be used for any metered liquid dispensing requirement. For example, it could be used for liquid detergent containers, for pouring a predetermined amount of liquid into a washing machine, or for dish washer detergent dispensing or even for premeasured oil dispensing for adding to the fuel tanks of two-cycle engine devices such as chain saws, motorcycles, lawn mowers, etc. The present invention could also be used for dispensing predetermined amounts of medication, both prescription and non-prescription types, such as cough medicine or the like, or for mouth wash, shampoo or other health care products.

As mentioned, the dispensing unit of the present invention may be a separate unit which is inserted into an existing container or may be integrally formed therewith. Alternatively, the unit may be adapted so as to fit onto a container but attach to its outside such as by a screw on or snap on mechanism. Other attachment adaptions may be used without exceeding the scope of the invention.

Obviously, numerous modifications and variations of the present invention are possible in light of the above teachings. It is therefore understood that within the scope of the appended claims, the invention may be practiced otherwise than as specifically described herein.

What is claimed is:

1. In a container having an outlet and having a liquid metered dispensing unit at its outlet, the improvement which comprises:

the dispensing unit having a loading chamber, a loading chamber fill port, a dispensing chamber, a dispensing chamber outlet port, and a connecting orifice, wherein said loading chamber is located at least partially adjacent to said dispensing chamber, wherein said loading chamber fill port is located at an upper portion of said loading chamber such that when said container is tipped for pouring, liquid in said container may fill said loading chamber, wherein said connecting orifice connects a lower portion of said loading chamber with at least part of said dispensing chamber, wherein said dispensing chamber is connected to said container for liquid flow thereto from the container only via said loading chamber, wherein said dispensing chamber outlet port is located at the top of said dispensing chamber and at the top of said dispensing unit, said dispensing unit further including a closable valve located in said connecting orifice, biasing means maintaining said valve in a closed position while being capable of moving said valve to an open position by downward force on said biasing means, said dispensing unit further including a cap located at the top of said container and means connectively related to said cap so as to apply downward force on said biasing means and on said valve when said cap is closed so as to open said valve, and so as to remove said downward force so as to close said valve when said cap is open.

2. The container of claim 1 wherein said container has a main body and has a neck and its outlet and wherein said liquid metered dispensing unit is an inserted unit which nests within the neck of said container.

3. The container of claim 1 wherein a single inner wall separates said loading chamber and said dispensing chamber.

4. The container of claim 3 wherein said single inner wall includes a small vent orifice connecting said loading chamber and said venting chamber at their upper portions.

5. The container of claim 1 wherein said cap is a screw cap.

6. The container of claim 3 wherein said cap is a screw cap.

7. The container of claim 1 wherein said cap is a flip cap.

8. The container of claim 3 wherein said cap is a flip cap.

9. The container of claim 1 wherein the means connectively related to said cap to apply downward force on said biasing means and on said valve is an extension inside of the cap that contacts said biasing means.

10. The container of claim 6 wherein the means connectively related to said cap to apply downward force on said biasing means and on said valve is an extension inside of the cap that contacts said biasing means.

11. The container of claim 8 wherein the means connectively related to said cap to apply downward force on said biasing means and on said valve is an extension inside of the cap that contacts said biasing means.

12. The container of claim 1 wherein said biasing means is a spring and a rod connected to said valve.

13. The container of claim 6 wherein said biasing means is a spring and a rod connected to said valve.

14. The container of claim 8 wherein said biasing means is a spring and a rod connected to said valve.

15. The container of claim 1 wherein said means connectively related to said cap so as to apply downward force on said biasing means and on said valve, and said biasing means itself, comprise a push-pull mechanism for opening and closing said valve.

16. The container of claim 6 wherein said means connectively related to said cap so as to apply downward force on said biasing means and on said valve, and said biasing means itself, comprise a push-pull mechanism for opening and closing said valve.

17. The container of claim 8 wherein said means connectively related to said cap so as to apply downward force on said biasing means and on said valve, and said biasing means itself, comprise a push-pull mechanism for opening and closing said valve.

* * * * *